Patented Oct. 21, 1941

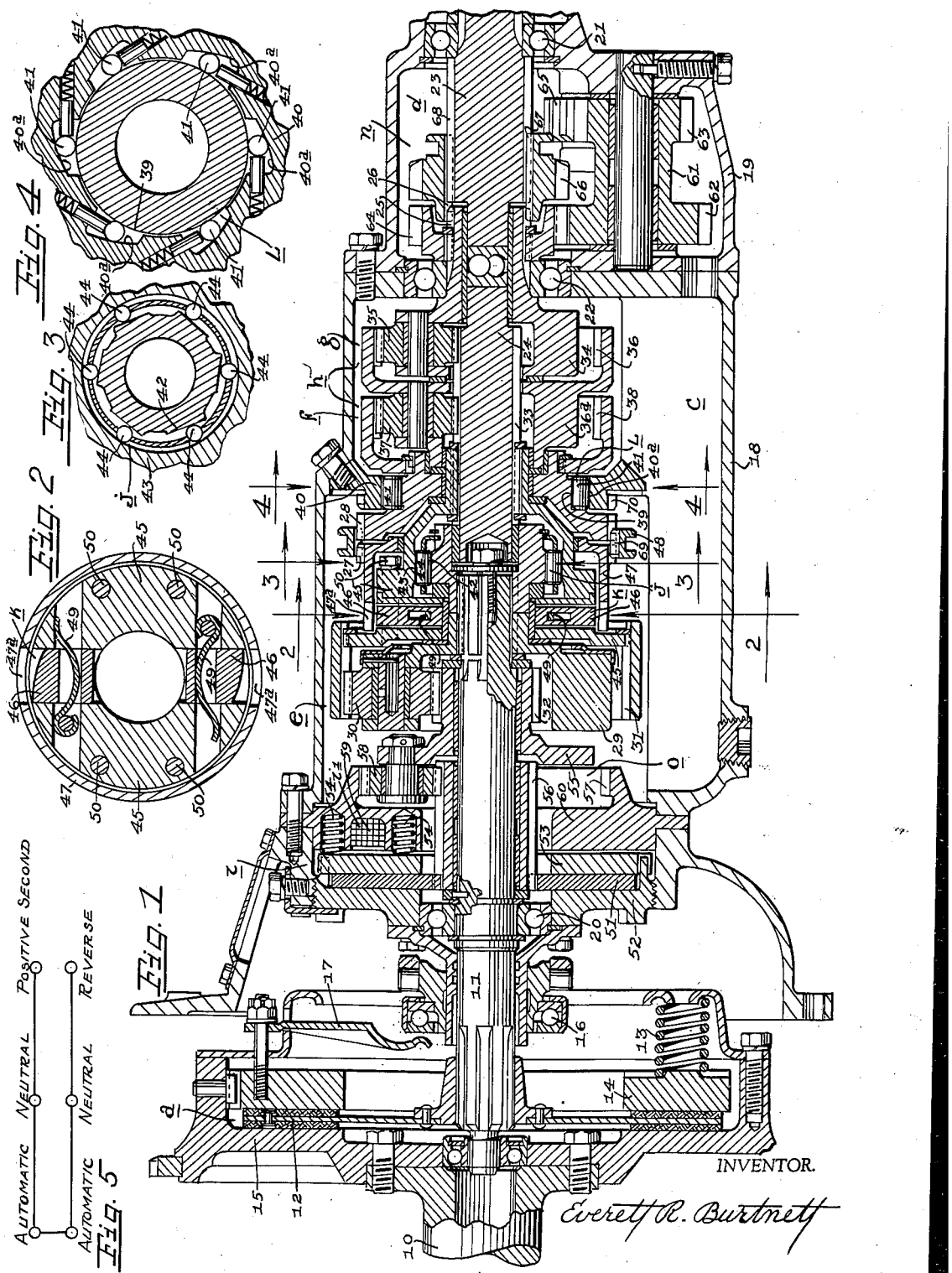

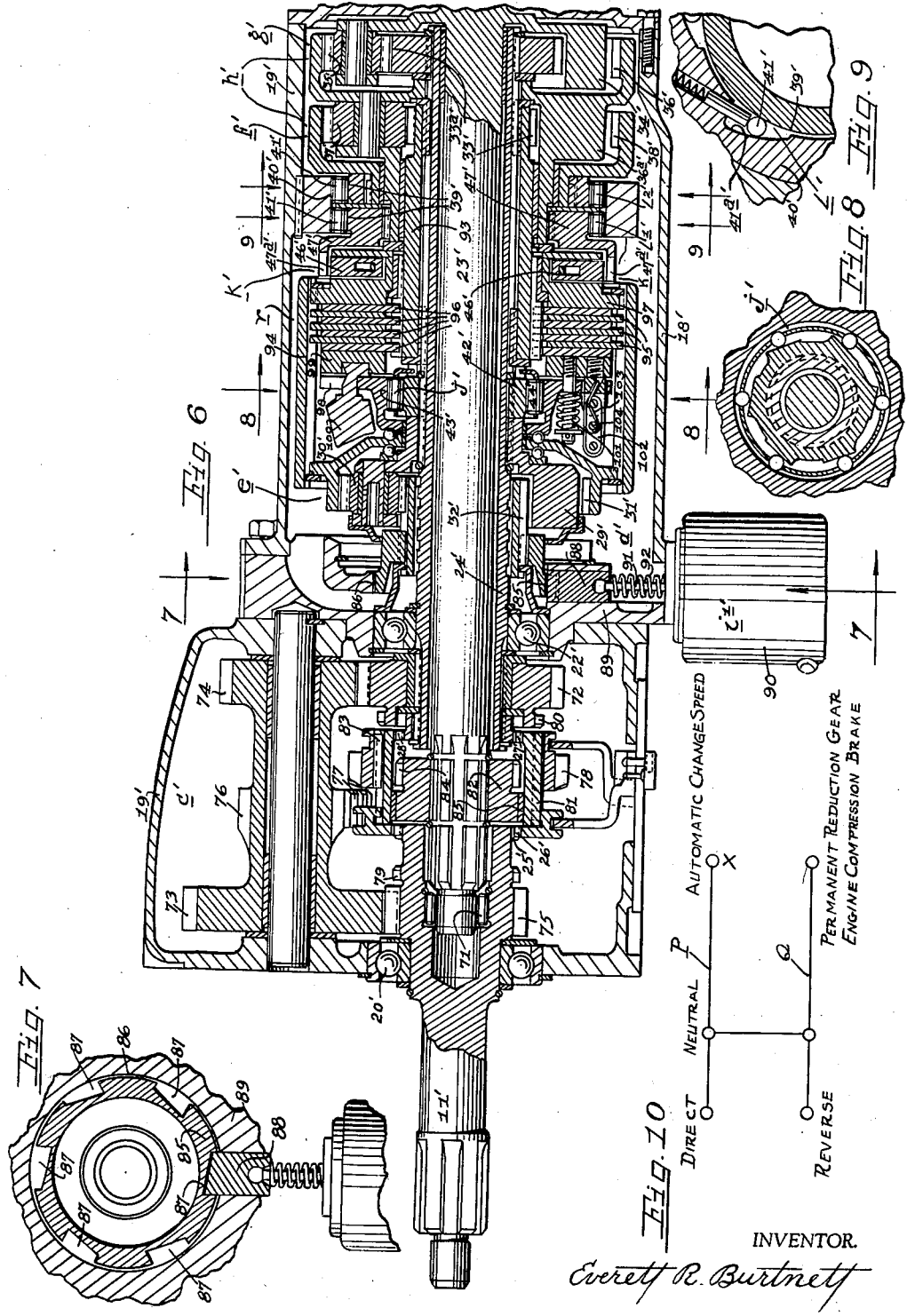

2,259,732

UNITED STATES PATENT OFFICE 2,259,732

POWER TRANSMITTING MECHANISM

Everett R. Burtnett, Los Angeles, Calif., assignor of one-half to Edith Glynn Burtnett, Los Angeles, Calif.

Application February 14, 1939, Serial No. 256,264

39 Claims. (Cl. 74—260)

This invention relates to transmission mechanism and more particularly to an automatically variable change speed transmission.

In connection with a conventional motor vehicle change speed gear box having low and intermediate speed reduction gear ratios and a direct drive ratio with a reverse gear ratio, each for manual shift-gear selection by the driver, it has been proposed, and practiced to some extent, to arrange a drive coupling juncture in the transmission, usually at the rear of the selective forward speeds and reverse gearbox, equipped with both a one-way clutch and a shiftable positive clutch member, respectively, for selectively rendering this drive coupling juncture either one-way drive operative or locked by the positive clutch member as a positive two-way drive coupling. Through which juncture, in one-way clutch operating status, or in positively locked coupling status, any one of the aforementioned manually selected ratios would depend for coupled driving connections at some point between a power source driving member and a load propelling driven transmission member. In connection with this selective one-way or positive drive coupling provision are usually an accompanying overdrive gear set and an automatic speed responsive clutch mechanism, the latter adapted operable under certain conditions to automatically establish the gear function of this overdrive gear set in a driving status between the respective drive and driven parts thus, as a next-in-speed immediately supplanting speed ratio therebetween, to overrule the direct drive ratio rendered by the mentioned one-way clutch. Ability of the overdrive ratio to establish over the direct drive ratio depends upon the one-way clutch being the selected coupling status between the respective drive and driven parts. The alternative status being selection of the positive coupling of the direct drive whereby the overdrive is rendered incapable of establishing. A further accompanying provision of the practice thus far described comprises a brake mechanism for giving reactance to the gear drive pivotal element or orbital gear of the overdrive gear train and to adapt this brake mechanism to normally but yieldingly apply but for release by the driver setting some means into action which would accomplish same. One means in practice being a pawl and ratchet mechanism provided with resilient means normally urging engagement of the pawl with the ratchet whereby the brake is normally applied. With a solenoid forming an electromagnetic device for actuating the pawl out of engagement with the ratchet when the solenoid is supplied with current usually resulting from the driver depressing the accelerator pedal beyond a fully open throttle position thereby closing a switch. By this means, providing for automatically obtaining release of the brake and consequent cancellation of the overdrive for the mobilized driving connection of the mentioned one-way clutch to resume the direct drive ratio function until the power was temporarily shut off to enable the pawl to reengage the ratchet. In general, the practice is to provide mechanism establishable by a shift on the part of the driver to render free-wheeling at a direct drive forward speed, in which selection the overdrive may automatically establish under certain conditions to supplant the direct drive and in which the direct drive is later retrievable to temporarily supplant the overdrive by depressing the accelerator pedal to or beyond a predetermined position.

A performance limitation of automatic change speed transmission mechanism in accordance with the foregoing is, requirement for the driver to shift the elements of the gearbox into a reduction gear on each occasion of starting the vehicle from a standstill and the requirement to again shift the elements of the gearbox from the starting reduction gear into an intermediate reduction gear for advantageous higher acceleration of the vehicle following attainment of its first momentum under drive of the starting reduction gear, so that the one-way direct drive or the overdrive ratio may be preceded by good starting and acceleration gears.

A further performance limitation of automatic change speed transmission mechanism in accordance with the foregoing is the inability, due to the positive character of the pawl and ratchet provision for applying or releasing the brake and consequently for obtaining reversion to direct drive from overdrive and later to retrieve the direct drive, to obtain either of these changes under torque.

In connection with a motor vehicle transmission equipped with an overdrive ratio, it is a practice to provide for a considerable axle reduction at the differential so that overdrive, constituting the top or high speed ratio of the usual four forward speeds, will raise the speed of the vehicle driving wheels relative to the engine speed to a ratio which would compare with a so-called fast axle reduction ratio at the differential such as employed in connection with four forward speed transmissions having no overdrive but wherein direct drive constitutes the top or high forward speed. In keeping with the trend of late to provide a higher H. P. to vehicle weight ratio, it is desired to enable the vehicle to be operated whenever practical in what might be termed an abnormally high gear. Either the overdrive top speed with a slow axle or the alternative direct drive top speed with a fast axle accomplishes this. In either case, advantageously a reduction gear ratio for higher rate acceleration ability could usually prevail right up to the vehicle speed attainment at which the abnormally fast top speed would be satisfactory. In accordance with this it has been contemplated more recently in direct drive top speed transmissions, and more particularly in automatically variable speed transmissions, to step from an under-gear giving an appreciable reduction ratio immediately to the direct drive fourth, omitting the third speed from the normal progression of upward speed changes culminating in high gear, but providing for downward change at the will of the driver from fourth to third to enable passing other vehicles under a higher torque or to provide for obtaining a good so-called climb gear ratio with ease and preferably under torque as a temporary substitute for the abnormally fast top speed. If the same performance is to be attained in a transmission having overdrive as the top speed, the normal progression of automatically changed speeds upward would step from an under gear giving an appreciable speed reduction ratio immediately to the overdrive top speed, likewise omitting the third, in this case consisting of the driect drive ratio, from the normal progression of upward speed changes culminating in high gear.

In view of the hereinbefore described practice entailing the complexity of a manual shift-gear variable forward speed gearbox and an automatically variable speed gear set of which an overdrive serves as the top speed ratio and cooperating mechanism with the latter, without inclusion of a reduction gear ratio in the range of automatically variable speeds, and imposing inability to obtain the automatic changes of speeds, that are afforded, under torque; and based on the potentialities for improvements set forth in the foregoing résumé of present practices, the present invention has for a general object the provision of a change speed transmission especially well suited for use in motor vehicles wherein, an automatically variable change speed range, without requiring a shift of gear elements or otherwise positive form of selective drive connecting elements is provided for, wherein incidental to a standing start of the vehicle or to low speed vehicle operation a reduction gear ratio will automatically prevail; wherein under certain conditions upon desired acceleration attainment of the vehicle under drive of a reduction gear ratio, preferably, an overdrive gear ratio will normally automatically establish as the immediately supplanting driving ratio over a reduction gear ratio, thus normally omitting establishment of direct drive ratio from the progression of automatically effected speed changes culminating in an overdrive gear ratio constituting the top speed; wherein driving connections, preferably, for a direct drive ratio will be automatically established in a mobilized state incidental to the automatic establishment of the overdrive ratio taking place to supplant the reduction gear ratio, so that in event thereafter the overdrive ratio should be forced into a neutral state by an act of the driver the direct drive ratio would assume the drive rather than the reduction gear ratio which preceded initial establishment of the overdrive state; wherein, preferably flexible, brake mechanism normally automatically but yieldingly establishes the overdrive gear train gear functional, rather than positive means to the same end, and wherein improved flexible means, preferably electro-magnetic in character, are provided whose function it is, when energized, to cause release of the respective brake. All such that the driver may at his option by depressing a single accelerator pedal beyond a certain position or by depressing a sub-accelerator pedal any degree, or by other suitable means close a switch for energizing the electro-magnetic mechanism and thus obtain an automatically forced rendering of the overdrive gear set neutral for change from overdrive to direct drive under torque, and by relaxing the respective control pedal resultant brake application would retrieve the overdrive ratio also under torque. And all such that three or more forward speeds involving an under-gear ratio, a direct drive ratio and an overdrive gear ratio, the latter at least establishable by an automatic speed responsive clutch mechanism, are provided for from a single preselected state of the transmission, requiring no shift of gears or the like in obtaining a duration of each the aforesaid speed ratios.

A further object of the present invention is to provide a change speed transmission mechanism including an automatically variable change speed transmission system giving a reduction ratio, a direct drive ratio and an overdrive ratio, all under a single preselected establishment of the transmission for rendering different forward speeds without further shift of gears or the like, and wherein the driving connections for both reduction gear ratio and direct drive ratio will remain mobilized, once the overdrive ratio has been established, so that one or the other of the reduction and direct drive ratios may be allowed to resume the driving function at their respective ratio without further manipulation than rendering the overdrive ratio inoperative.

A further object of the present invention is to provide a change speed transmission wherein a given one-way clutch mechanism is adapted, under certain conditions to serve a speed reduction ratio gear drive by a reduction gear set to which ratio there is no contribution from an overdrive gear set, and under certain other conditions to serve a direct drive ratio to which there is no gear functional contribution from either a reduction gear set or an overdrive gear set, while still providing an overdrive gear set adapted under certain conditions to overrule the drive function of the one-way clutch either when otherwise the one-way clutch would be under cooperating circumstances to serve a direct drive or a reduction gear ratio.

A further object of the present invention is to provide a change speed transmission for giving a speed reduction gear ratio, a direct drive or an overdrive gear ratio and including an automatic speed responsive clutch mechanism operable upon a temporary reduction in the speed of the driving member relative to the driven member for establishing the overdrive ratio immediately supplantively over the reduction gear ratio and for incidentally establishing the direct drive in a state of mobilized driving connections whereby cancellation thereafter of the overdrive would find the direct drive operable to assume the drive relinquished by the overdrive ratio.

A further object of the present invention is to provide a change speed transmission including a reduction gear train and an overdrive gear train and further including an automatic speed responsive clutch mechanism operable to connect the elements of the reduction gear train to rotate as a unit incidental to the respective clutch engaging to establish the overdrive ratio contributed to by the overdrive gear train.

A still further object of the present invention is to provide a change speed transmission having a reduction gear train and an overdrive gear train with the latter arranged as a driving input to certain element of the reduction gear train, and with drive coupling mechanism interposed between the overdrive gear train and the reduction gear train for establishing certain driving connection whereby the overdrive gear train may input its overdrive gear ratio to the elements of the reduction gear train for driving continuity by the latter to the load, all such that the drive connecting coupling mechanism being on the output side of the overdrive gear train and for transmitting its overdriven gear ratio of speed having a correspondingly reduced torque may perform their power transmitting respective drive coupling function, establishing driving continuity as of elements of overdrive and reduction gear trains, at reduced torque ratio. Other features relate to various novel combinations of parts and desirable particular constructions.

A preferred embodiment and another embodiment of the invention are illustrated by way of example and other objects and possibilities in the design of a transmission embodying the present invention will be more apparent hereinafter as the following detailed description of the two illustrative embodiments progresses, reference being had to the accompanying drawings, in which:

Figure 1 is a longitudinal vertical section through a change speed transmission illustrative of a preferred embodiment of the present inventiton, wherein a flexibly applicable and releasable brake mechanism cooperates with the overdrive gear train, and wherein the reduction gear set is completely driven either at one time by the overdrive gear train or at another time by a direct driving one-way clutch.

Figure 2 is a transverse vertical section on the line 2—2 of Figure 1, showing a suitable form of automatic speed responsive clutch mechanism for establishing an output connection from the overdrive gear set.

Figure 3 is a transverse vertical section on the line 3—3 of Figure 1, showing a suitable form of one-way clutch for drive to the reduction gear set without dependence upon the overdrive gear set.

Figure 4 is a transverse vertical section on the line 4—4 of Figure 1, showing a suitable form of one-way stop brake to give reactance to the gear drive pivotal or orbital element of the reduction gear set.

Figure 5 illustrates a preferred shift pattern for establishing the transmission illustrated by Figure 1 either for automatic change speed operation, for reverse or for positive gear drive such as a permanent second speed.

Figure 6 is a longitudinal horizontal section through a change speed transmission illustrative of another embodiment of the invention, wherein a positive type establishable and disestablishable brake connection cooperates with the overdrive gear train, and wherein one gear train, of a reduction gear set comprised of a plurality of gear trains for simultaneous parallel multi-path power-flow, is adapted to be permanently driven by a positive direct drive input and another gear train of which plurality is adapted to be driven either at one time by a direct driving one-way clutch or at another time by the overdrive gear train.

Figure 7 is a transverse section taken on the line 7—7 of Figure 6, showing a pawl and ratchet form of release for the normal brake connection with the overdrive gear set embodiment of my present invention, together with the solenoid means for actuating the release. This more or less conventional means for forcing release of brake means to an overdrive gear set is in a measure comparable to, but not as flexible as, means to similar ends illustrated in Figure 1 and forming a feature of the present invention.

Figure 8 is a transverse section taken on the line 8—8 of Figure 6, showing a suitable form of one-way clutch serving on the input side of the reduction gear set embodiment of the present invention.

Figure 9 is a fragment of a transverse section on either of the lines 9—9 of Figure 6, showing a suitable form of cam and roller type one-way stop brake mechanism for either of the two pivotal elements of the double gear train reduction gear set illustrated in this embodiment of my present invention.

Figure 10 illustrates a preferred shift pattern for selecting the transmission embodiment of my present invention, as illustrated by Figure 6, either for automatic change speed, neutral, direct, reverse or permanent positive reduction gear.

Given reference characters will designate parts having no differential as between those employed in the transmission form illustrated by Figures 1 to 5, inclusive, and the transmission form illustrated by Figures 6 to 10, inclusive.

Referring first to the Figures 1 to 5, inclusive, 10 designates the power source driving member such as the crankshaft of an internal combustion engine installed in a motor vehicle. For driving continuity in axial alignment is the usual clutch shaft or main driving transmission member 11 carrying rotatable therewith the usual driven clutch disk 12 of a master clutch unit a having the usual springs 13 energizing clutch packing of the disk 12 by the usual pressure plate 14 against the flywheel 15, and the usual clutch throw-out bearing 16 for actuating the clutch release fingers 17 whereby the pressure plate 14 would be retracted rearwardly a sufficient distance to loosen the driven disk 12.

A gearbox is formed, preferably in two compartments c and d, by cases 18 and 19, supporting a forward main transmission bearing 20 in the forward end wall of the forward case 18, supporting a rear main transmission bearing 21 in the rearward wall of the case 19 and supporting an intermediate main transmission bearing 22 in the intermediate wall which forms the juncture of the cases 18 and 19.

A driven main shaft or driven member 23, adapted for two-way drive coupling to the driving wheels of the vehicle, reposes principally in the gearbox compartment d and in axial alignment with the clutch shaft 11, while a coaxial intermediate main shaft or transmission member 24 reposes operatively between the clutch or main driving transmission member 11 and the main driven member 23.

Constituting the gear train components of a multi-forward speed transmission system preferably adapted for automatically variable change speed after jaw clutch elements 25 and 26 and jaw clutch elements 27 and 28, respectively, have been engaged as revolvable units, are gear trains e, f and g. The gear train e, preferably, forming an overdrive gear set, while the gear trains f and g, preferably, form a speed reduction gear set h.

An electric-magnetic device i forms means normally establishing the overdrive gear set e to render gear function and forms means adapted to be served with a closed circuit, preferably at the will of the driver, thereby to operate and render the overdrive gear set e inoperative and whereby, solely while rendering the overdrive gear set e inoperative during a moment of exercised will on the part of the driver, will electrical energy be consumed by this device.

A one-way clutch j forms means for drive serving certain elements of the reduction gear set h while the overdrive gear set i is in any manner prevented from drive serving certain elements of the reduction gear set h.

Adapted operable to automatically establish a certain drive connection whereby the overdrive gear set i will be connected to render an overdrive ratio to the driven member 23 is an automatic speed responsive clutch unit k, preferably of the positive type and preferably operable upon a temporary reduction in speed of the driving member relative to the driven member which may be termed a torque-reversal control of the speed responsive clutch. In the present invention an auxiliary feature being dependency upon whether or not this automatic speed responsive clutch k is functioning as to whether an overdrive output of the overdrive gear set e will reach the driven member 23 as such or be reduced by the reduction gear set h to an undergear ratio.

One-way stop brake mechanism L forms reactance means for the gear drive pivotal or base orbital element of the reduction gear set h. An auxiliary feature of the present invention being the plurality of planetary gear units in series for joint gear function to render a given speed reduction ratio and as such obtaining reactance from a given one-way stop brake adapted to give automatic brake release upon introduction of a supplementary input of rotative efforts into this reduction gear set h either at direct drive ratio through the joint medium of the one-way clutch j and functioning automatic speed responsive clutch k, or at overdrive ratio through the joint medium of the overdrive gear set e and the functioning automatic speed responsive clutch k.

Save for a friction type automatic speed responsive clutch unit r serving as an automatic coupling device both between the one-way clutch j' and the overdrive gear set e', the same major component units prevail in the modified illustrative embodiment of the present invention shown by Figure 6 as in the preferred embodiment shown by Figure 1 and accordingly are indicated by similar reference characters.

More in detail the invention embodiment illustrated in Figures 1 to 5, inclusive, comprises a planet gear carrier 29 fixed rotatable with the clutch shaft 11, planet gears 30 rotatably mounted by the carrier 29, a ring or internal or annulus gear 31 meshing with the planet gears 30 and a sun pivotal or gear-function orbital gear 32 meshing with the planet gears 30, all forming the overdrive gear set e.

Continuing the detailed description of Figures 1 to 5, inclusive, the intermediate main transmission shaft 24 is seen to form a sun drive gear 33 to each of two epicyclic gear trains f and g in series forming the reduction gear set h. A planet carrier 34, adapted for direct drive coupling by clutch parts 25 and 26 to drive the driven shaft 23, forms a member upon which are rotatably mounted planet gears 35 meshing with both an internal or annulus or ring gear 36 and the sun drive gear 33, all forming the planetary gear unit or epicyclic gear train g. While preferably, an integral portion 36a of the internal gear 36 of the gear unit g carries other planet gears 37 meshing with both the sun gear 33 and an individual internal gear 38, all forming the gear unit f. The gear units f and g find completion for gear function in series under drive of forward rotative efforts applying from the sun gear 33 in the one-way stop brake unit L preferably comprising a smooth surfaced hub 39 rotatable with the internal gear 38 of the gear unit f and an internally cam broached annulus 40 stationary with the gear case 18 and roller wedging members 41 engaging both the hub 39 and the cam surfaces 40a of the annulus 40.

Continuing reference to details of Figures 1 to 5, inclusive, the one-way clutch unit j, preferably, comprises a cammed hub 42 rotatable with the clutch or driving transmission shaft 11 and a concentric annulus 43 rotatable with the sungear-toothed intermediate shaft 24 and roller clutch members 44 engaging both the cammed hub 42 and the annulus 43. The one-way clutch j is seen thus to form a permanently mobilized one-way driving connection between the shaft 11 and the sun drive gear element 33 of the reduction gear set h, which by virtue of the permanently established one-way stop brake L in one instance renders the reduction gear set h normally gear functionally operable under any manifestation of forward rotative efforts in the shaft 11. The driven part annulus 43 of the one-way clutch unit j and in turn the sun gear element 33 of the reduction gear set h is seen to be connected rotatable with the internal gear 31 of the overdrive gear set e by a body 45 carrying centrifugally radially operably adapted engaging and driving positive clutch elements 46. By this arrangement the sun drive gear element 33 of the reduction gear set h is adapted in another and normally overruling instance to be driven at the overdrive output speed of the overdrive gear set e as long as the latter is not prevented from gear functioning, which establishes the one-way clutch unit j as a mobilized but normally overrunning drive coupling device upon which the sun gear element 33 of the reduction gear set h may depend for a lower ratio drive from the shaft 11 in the event of the gear function by the overdrive gear set e being cancelled. It will be seen therefore, that operating under drive of the one-way clutch unit j the output ratio of the reduction gear set h to the driven shaft 23 will be low reduction gear relative to the speed of the shaft 11, while operating under drive of the overdrive gear set e the output ratio of the reduction gear set h to the driven shaft 23 will be second reduction gear relative to the speed of the shaft 11. Accordingly, rendering the overdrive gear set e inoperative, such as would result of the sun gear 32 thereof being allowed to rotate freely, would establish the low reduction ratio and preventing the sun gear 32 from rotating would establish the overdrive gear set e gear functional under its permanent driving connection from the shaft 11 and in turn establish the second reduction ratio. The present invention is thus seen to provide change between different reduction gear ratios, respectively, as a result of whether or not the overdrive gear set e is enabled to gear function.

Continuing the detailed description of Figures 1 to 5, inclusive, an annulus 47 having slots 47a is seen to encompass the circumferential plane of the body 45 wherein the centrifugally operable engaging clutch parts 46 are carried rotatively. The slots 47a forming engageable mating clutch elements for receiving the centrifugal parts 46 and the slots 47a reaching registration under synchronized speeds of their respective carrying elements, namely members 45 and 47 and when the member 45 has sufficient speed of rotation to give operable centrifugal force to the speed responsive weight parts 46 for same to enter the slots 47a. Observing that the member 47 is normally coupled rotatable with the internal gear 38 by a shiftable jaw clutch member 48, it will be seen that engagement of the clutch unit k will couple the internal gear 38 rotatable with the overdriven output internal gear 31 of the overdrive gear set e which event, due to the permanent connection between the internal gear 31 of the overdrive gear set e and the sun gear element 33 of the reduction gear set h, will operate to lock the elements of the reduction gear set h together so that this final gear set h will, of itself, form a direct drive coupling. Under this direct drive coupling conversion of the reduction gear set h and through the medium of same the exact ratio of overdrive performance of the overdrive gear set e will reach the driven shaft 23. It will be seen that either disengagement of the clutch unit k or freeing the sun gear 32 of the overdrive gear set e to rotate freely will operate to cancel or disestablish this overdrive ratio to the driven shaft 23. If the sun gear 31 is freed to rotate freely while the clutch unit k remains engaged, it will be seen that the one-way clutch unit j will assume the drive of the mass constituted of the reduction gear set h retained in a direct drive coupling locked state by the engaged clutch unit k, so that the driven shaft will be driven at the same speed as the shaft 11, namely direct drive ratio. After engagement of the clutch unit k therefore, change of speed as from overdrive ratio to direct drive ratio is obtainable by simply rendering the overdrive gear set e inoperative that is to say incapable of gear functioning under its permanent input from the shaft 11. Again, a suitable method for rendering the overdrive gear set e inoperative in order to effect this step down in speed ratio i. e., from overdrive to direct drive, as compared to its same adaptability to effect a change i. e., from second to low reduction gear ratio performance by the reduction gear set h before being locked into a rotatable unit by the clutch k, is the releasing of the sun gear 32 of the overdrive gear set e. The present invention embodiment therefore, of reduction gear set, overdrive gear set, one-way clutch, automatic speed responsive clutch and means for rendering the overdrive gear set either gear functional or non-gear functional together with their novel corelations, provides for four forward speeds, namely, low and second reduction gear ratios and direct drive ratio and overdrive gear ratio.

Continuing reference to the details of Figures 1 to 5, inclusive, retractive springs 49 are provided for restraining the parts 46 of the automatic clutch unit k from engaging the member 47 until they are carried at a sufficient speed of rotation and for retracting or withdrawing these engaging clutch parts 46 automatically upon their carried speed of rotation reaching a point below said sufficient speed of rotation. Bolts 50 are seen to connect parts assembling the internal gear 31 of the overdrive gear set e and the sun gear 33 of the reduction gear set h rotatable as a unit. Since the sun gear 32 of the form of planetary gear unit shown in the illustrations of the present invention is adapted to operate as the pivotal or orbital element of the gear set e and accordingly must be prevented from rotating for the respective gear set to gear function in rendering its adapted overdrive transmission, and since this sun gear 32 is adapted to be released to rotate freely in order to render the overdrive gear set e neutral thereby to cause a change of speed at one time between two different reduction gear ratios and at another time between overdrive and direct drive ratio, it is important for the brake control over the sun gear 32 to be flexible, especially if the advantage of ability to effect the resultant respective changes of speed ratio under torque provided for are to be realized. Accordingly, Figure 1 illustrates a novel normally resilient means engagingly energized system of frictionally-engaging brake elements, preferably, comprising an engageable disk 51 for operative coupling to the sun gear 32, a bottom pressure stationary plate 52 on one side of the disk 51 and preferably longitudinally adjustably secured to the gear case 18, a non-rotatable but longitudinally movable presser plate 53 on the opposite side of the disk 51 and also non-rotatably secured to the gear case 18, compressed springs 54 normally active to thrust the presser plate 53 forwardly against the disk 51 and the latter in turn against the bottom plate 52. The disk 51 is thus gripped to the gear case 18. This friction brake function to the disk 51 together with an epicyclic gear train o, forming a preferable coupling between the disk 51 and gear case 18 on one side and the sun gear 32 on the other side, completes a rotation restraining connection between the sun gear 32 and the stationary case 18. The epicyclic gear train o forms an auxiliary feature of the present invention adapted to relieve the brake duty upon the friction disk 51 and preferably comprises a planet gear carrier 55 fixed to the sun gear 32, a sun gear 56 non-rotatably connected to the brake disk 51, a stationary internal gear 57 fixed to the gear case 18 and planet gears 58 rotatably mounted by the carrier 55 and meshing with both the sun gear 56 and the internal gear 57. An advantage of this form of epicyclic gear train o, interposed between the disk 51 and stationary case 18 on one side, respectively, at different respective elements of the train o and the sun gear 32 on the opposite side at a still different element of the train o, is the capacity of the internal gear element 57 to mechanically render the greater ratio of the brake action leaving but a slight ratio for the friction disk 51 to perform.

Taking advantage of the minimized tension requirement of the brake energizing springs 54, the present invention has as a still further auxiliary feature the provision of a magnet 59 preferably positioned in a stationary member 60 which latter forms a back plate to the presser plate 53. The magnet 59 normally de-energized so that there is no interference with the springs 54 thrusting the presser plate 53 forwardly thereby normally brake packing the friction disk 51 between the presser and bottom non-rotatable plates 53 and 52. The magnet 59 adapted to be energized solely at the will of the driver to pull the presser plate 53 rearwardly, with consequential release of the disk 51, when it is desired to overrule the gear functional state of the overdrive gear set $e$ with a forced neutral state for a resultant downward step of change speed ratio. Suitable control means for establishing a circuit for electric current to energize the magnet 59 would be an auxiliary pedal (not shown) positioned beside the customary accelerator pedal, which auxiliary pedal could be actuated either singularly independently of the customary or main accelerator pedal or could be included with the main accelerator pedal under actuation by the driver's accelerator foot. The auxiliary pedal could be adapted, upon being depressed only a little, to operate a switch to supply current to the magnet 59, whereby the lower speed ratio compelling influence would be obtainable under torque, but at any ratio of power desired. This compares advantageously over an adaptation wherein to obtain current supply to an electromagnetic device for introducing a lower speed ratio would depend upon the customary single accelerator pedal being depressed beyond a fully open throttle position, for the latter imposes that the thus lower speed ratio impelling influence would be operative only under full power. Thus it will be seen that the present invention provides an overdrive gear set adapted to be rendered neutral at the will of the driver thereby to either change a speed reduction gear ratio to a still lower ratio or to change from overdrive ratio to direct drive ratio, and which preferably includes a frictionally engageable and disengageable brake mechanism whereby the overdrive gear set is either rendered operative or inoperative and which further preferably includes an epicyclic gear train as a complement to the friction type preferred form of brake mechanism for the greater proportion of the required brake influence to be borne by the mechanical train of this epicyclic gear train leaving only a minor proportion of the brake influence to be borne by the friction complement of the brake device, and which still further prefereably includes low pressure resilient means normally effective to energize engagement of the minimized friction complement requirement, together with a magnet provision required only to overcome the low pressure manifestations of this minimized duty resilient means to obtain release of the friction complement of the brake mechanism.

To meet the requirement for a manually selective forward, neutral and reverse component in the transmission, a preferred form of provisions to these ends is illustrated by Figure 1 comprising a countershaft 61 consisting of cluster gears 62 and 63, with a drive gear 64 rotatable with the driven member planet carrier 34 of the gear set $h$ and meshing with the countershaft gear 62 and a reverse idler gear 65 meshing with the countershaft gear 63, together with a shiftable driven gear 66 connected rotatable with the driven shaft 23 by the usual splines 67 and 68. Preferably the splines 67 of the shiftable gear 66 forming jaw clutch parts 26 for engagement with corresponding parts 25 formed on the contiguous end of the relative driving member 34 being the driven planet carrier of the final gear train of the reduction gear set $h$. By which jaw clutch coupling selective driving connections for forward drive are adapted to be pre-established while the shiftable gear 66 is positioned forwardly. The gear 66 being alternatively adapted, in a rearwardly position, to mesh with the reverse idler gear 65 thereby completing a reverse drive gear train between the respective driving member 34 and the driven shaft 23 through gears 64, 62, 63, 65 and 66. In an intermediate position the gear 66, out of mesh with the reverse gear 65, adapted to have uncoupled the members 34 and 35 thus establishing the transmission neutral. As a further selective arrangement, stationary clutch jaws 70 are provided for engagement by splines 69 of the jaw clutch member 48 when the latter is shifted into an extreme rearward position but wherein the splines 69 remain meshed with the jaws 28. This alternative positioning of the clutch member 48 is adapted to free the member 47 such that engagement of the automatic clutch parts 46 with the member 47 would not complete a driving connection between the internal gear 31 of the overdrive gear set $e$ and the internal gear 38 of the reduction gear set $h$. By this arrangement, while the clutch member 48 occupies its rearmost shiftable position, the internal gear 38 will be positively locked to the gear case 18 thus rendering the reduction gear set $h$ permanently positive two-way gear drive operative between the internal gear 31 of the overdrive gear set $e$ and the planet carrier 34 of the reduction gear set $h$. With the gear 66 positioned to couple the carrier 34 and driven shaft 23 together and as long as the overdrive gear set $e$ is not rendered neutral by a supply of current to the magnet 59, a positive two-way gear drive giving second gear ratio by the combined gear functions of gear sets $e$ and $h$ will prevail between the clutch shaft 11 and driven shaft 23. This positive gear may be used for long grades, engine compression brake against the vehicle descending grades to relieve the vehicle brakes or for parking the vehicle "in gear" against movement in either direction.

Referring to the sole shiftable members 48 and 66 of the preferred embodiment of the invention illustrated by Figure 1, the shift plane of the shift pattern illustrated by Figure 5 which includes "Automatic, Neutral and Positive Second" indicates shiftable positions for the clutch member 48, while the alternative shift plane which includes "Automatic, Neutral and Reverse" indicates shiftable positions of the gear 66. Any desired form of shift mechanism for accomplishing these alternative shift positions in the two shift planes, preferably with a "cross over" between planes and occupying the "Automatic Position" may be provided.

Operation of the preferred embodiment of the present invention as illustrated by Figures 1 to 5, inclusive, follows:

*Automatic change speed range*

With the shiftable members 48 and 66 positioned as shown, the transmission is preselected in forward for automatic change of speeds. As in the conventional motor vehicle transmission, the master clutch $a$ is adapted to be disengaged by depressing the usual clutch pedal (not shown) while the vehicle is at a standstill, the transmission in gear, and the engine idling. Allowing the clutch $a$ to engage and accelerating the engine while leaving the overdrive gear set $e$ normally operative results in power transmission through clutch shaft 11, overdrive gear train $e$, thence through the body 45 to the sun gear 33 of the reduction gear set $h$ and finally through the combined gear trains of the gear set $h$ to the driven shaft 23 through the coupling at engaged parts 25 and 26 and 67 and 68. Due to the overdrive gear set $e$ being allowed to contribute to this normally initial starting gear ratio its reduction ratio will constitute second gear of for example 1.96:1 as between the clutch shaft 11 and the driven member 23. With the comparatively low final reduction at the differential to the driving wheels (not shown) but which would be incorporated in connection with an overdrive ratio such as provided for in the present invention transmission design, this normal starting gear ratio of reduction would be ample for normal conditions. An alternative lower reduction ratio for starting the vehicle, by the present invention is obtainable with ease at the option of the driver by simply establishing a current supply to the magnet 59, whereupon the presser plate 53 would be forced out of engagement with the disk 51, consequently the overdrive gear set e rendered neutral and consequently the rotative efforts of the clutch shaft 11 transmitted directly through the one-way clutch j to the sun gear 33 of the reduction gear set h. A resultant lower reduction ratio of, for example, 2.61:1 as between the clutch shaft 11 and the driven member 23 would prevail. Therefore, if the driver causes release of the brake unit i upon engaging the clutch a to start the vehicle, an exemplary low gear ratio of 2.61:1 will prevail until the current is cut off from the magnet 59 allowing automatic application of the brake unit i and consequential taking over of the drive to the sun gear 33 of the reduction gear set h from the clutch shaft 11 by the overdrive gear set e, overrunning at the one-way clutch j and thus changing the reduction ratio from low 2.61:1 to an exemplary 1.96:1 between the members 11 and 23. It will be seen that the friction type brake i reestablishable in brake effect by simply cutting out the current to the magnet 59 provides for change at the option of the operator either way between the exemplary reduction ratios of 2.61:1 versus 1.96:1 under torque if desired.

To succeed either the 2.61:1 low gear ratio or the 1.96:1 second gear ratio with a faster speed ratio the driver need but temporarily allow the driving member 10 (engine) to decelerate in speed relative to the speed of the driven member 23, i. e., shut off or reduce the power sufficiently to obtain torque reversal in the transmission between the drive shaft 23 and engine shaft 10 or clutch shaft 11. A result being the tendency of the sun gear 33 to slow down with the engine, the centrifugal automatic clutch parts 46 to also slow down and the member 47, connected by the clutch member 48 to the internal gear 38 to accelerate toward synchronism with the decelerating parts 46 until synchronism is reached, whereupon the parts 46 will centrifugally enter the slots 47a effecting engagement of clutch k. Resumption of power now finds the engaged clutch k locking the sun gear 33 and the internal gear 38 together and in turn the connection of the combined elements of the reduction gear set h to rotate as a unit. Whereupon, if the overdrive gear set e is left normally operative the thus temporarily torque-reversally accomplished change speed will find the overdrive ratio output of the gear set e prevailing through the locked gear set h and delivering at an exemplary 0.75 to 1 ratio to the driven member 23 from the engine and clutch shaft 11, representing substantially 1.33 turns of the member 23 by one turn of the members 10 and 11. The normal step therefore upon torque-reversal would be from 1.96:1 reduction ratio to the 1.33 over 1 overdrive ratio. However, should the requirement for establishment of a faster speed than the 1.96:1 reduction ratio, as contemplated obtainable by temporary torque-reversal, find the overdrive alternative (fourth forward speed) ratio too high, here again release of the brake i, after completion of the torque-reversal engagement of the clutch k, by the driver simply causing current to reach the magnet 59, would render the overdrive gear set e inoperative, with the result that instead of the overdrive gear set e driving the locked gear set h, the direct driving one-way clutch drive to the locked gear set h would prevail. Therefore establishing at the will of the driver a direct drive (third forward speed) ratio as a substitute for the overdrive (fourth) gear ratio supplanting the 1.96:1 reduction ratio.

It will be seen therefore that normally, a transmission constructed in accordance with a preferred embodiment of the present invention such as illustrated by Figure 1, would initially give an exemplary 1.96:1 reduction gear and under temporary torque-reversal would supplantively establish an exemplary 0.75 overdrive ratio. But, by initially releasing the brake i to the overdrive gear set e an exemplary 2.61:1 reduction low gear ratio would first occur; that later, immediately following torque-reversal, releasing the brake i, a direct drive third speed ratio would supplant the second gear ratio; and that later allowing reapplication of the brake i an exemplary 0.76 overdrive fourth speed ratio would supplant the direct drive third speed ratio. From a standing start a getaway under four automatically obtainable forward speeds being provided for without a shift.

Also, once established in overdrive fourth speed, the present transmission is adapted to be caused to change, under torque back to third (direct drive) for the latter's employment as a "pick up or climb gear" in the stead of the comparatively lower torque overdrive fourth speed, by the driver simply supplying current to the magnet 59. Reestablishing the overdrive (fourth) ratio at will (also under torque) by cutting off the current to the magnet 59.

*Permanent driving or engine compression brake gear*

The clutch member 48 is shifted from the forward position in which it is shown to a rearward position in which it will engage the stationary jaws 70 while remaining splined to the internal gear 38. In the establishment of this permanently operable and positive gear ratio between the clutch shaft 11 and driven shaft 23, the gear 66 is depended upon as a coupling complement connecting the planet carrier 34 and the driven shaft 23. Normally a positive two-way drive operable gear of an exemplary 1.96:1 ratio will be the established operative connection between the members 11 and 23, contributed to by both the overdrive gear set e and the reduction gear set h, as a result of the clutch member 48 occupying a rearward position thus positively connecting the internal gear 38 to the gear case 18, while the gear 66 retained in its forward position shown completes the forward operative connection with the driven shaft 23. But, by releasing the brake unit i the exemplary 2.61:1 low gear ratio in a one-way driving capacity through the medium of the one-way clutch j from the clutch shaft 11 to the reduction gear set h may be established operative as long as the magnet 59 is energized. Accordingly, even the permanently establishable positive gear ratio of second reduction speed ratio proportions is adapted, by the preferred embodiment of the present invention, to be automatically and flexibly supplanted by a sub-lower speed reduction gear ratio obtainable under torque for propelling the load by virtue of the adaptation of the overdrive gear set component of the invention to be rendered inoperative without a shift.

Reverse

With the clutch member 48 left in the positive in which it is shown, the gear 66 is shifted into a most rearward position, thus uncoupling the planet carrier 34 from the driven shaft 23 and establishing the gear 66 in mesh with the reverse idler gear 65. Depending upon operation of the transmission mechanism between the shaft 11 and the gear 64, with either the overdrive gear set e left normally operative for a second gear ratio drive to the gear 64 or the overdrive gear set e rendered inoperative by energizing the magnet 59 for a low gear ratio drive to the gear 64, the train of gears consisting of members 64, 62, 63, 65 and 66 will operate to give a reversing function over the drive delivered by the gear set h to the gear 64.

Thus I have described a preferred embodiment of my present invention wherein a lower than normally established ratio of speed reduction and wherein a direct drive ratio as compared to an overdrive ratio, respectively, may be established under torque if desired by flexibly rendering a normally operative overdrive gear set inoperative, and wherein by flexible control for rendering the overdrive gear set inoperative at will and for reestablishing same operative, either without a shift and under torque, automatically variable change speed transmission is rendered automatically variable change speed operable to change between a given driving member and a given driven member from low to second to direct to overdrive ratios, or from second to overdrive, or from low to second to overdrive, or from low directly to overdrive, or from low directly to direct drive, or from overdrive to direct drive.

Referring now to the modified embodiment of my present invention illustrated by Figures 6 to 10, the engine shaft and master clutch is seen to be omitted from the illustration. A clutch shaft 11' is shown however, with the driven shaft 23' for propelling the load and which is adapted to be coupled in positive operative connection with the driving wheels of the vehicle, extending in axial alignment into contiguity with the clutch shaft 11' and so as to pilot journal in the latter by a customary pilot or spigot bearing 71. The intermediate shaft 24', instead of forming a sun drive gear to both epicyclic gear trains constituted of the reduction gear set h as of the illustration by Figure 1, forms in this embodiment a sleeve concentric to an intermediate portion of the driven shaft 23' and carries a sun gear 33a' of the final epicyclic gear train g' of the reduction gear set h'. Differentiating further, the sleeve shaft 24' directly drives the one-way clutch j' as compared to the clutch shaft 11 in Figure 1 directly driving the same one-way clutch component j. Differentiating further, the sleeve shaft 24' and the driven shaft 23' are adapted to be selectively coupled, respectively, at their forward ends to rotate with the clutch shaft 11'.

A second gear ratio reduction gear train comprising, a final driven gear 72, preferably mounted rotatable on the sleeve shaft 24', a countershaft pair of integral cluster gears 73 and 74 the latter meshing with the gear 72, and a drive gear 75 rotatable with the clutch shaft 11' and meshing with the other named countershaft gear 73, is provided for jaw clutch selection at the driven gear 72 directly to the driven shaft 23'. Differentiating from the selectable positive second gear ratio provision in the Figure 1 illustrated embodiment, the provisions to a similar end in the modified embodiment has no dependency upon the planetary gear unit components e', f' and g' of the invention, instead comprising an independently establishable positive gear train in constant mesh requiring only a jaw clutch coupling to the driven shaft 23'.

Selective reverse gear comprises a reverse drive pinion 76 integral with the countershaft cluster gears 73 and 74, a reverse idler gear 77 constant meshing with the gear 76 and a shiftable reverse driven gear 78. The reverse driven gear 78 also adapted to be directly coupled to the driven shaft 23', so that reverse drive in this modified embodiment illustration of the present invention is also without dependency upon the planetary gear trains e', f' and g' of the automatic change speed mechanism.

Longitudinally spaced clutch jaws 79 and 25' are formed on the clutch shaft 11', as are clutch jaws 28' and 80, respectively, formed on the sleeve shaft 24' and on the second speed driven gear 72. A shiftable jaw clutch member 81 normally for relative rotation encompasses an enlarged portion 82 of the driven shaft 23'. Splined upon the periphery of this clutch member 81 is the shiftable reverse driven gear 78 and the splines 83 of which gear 78 are adapted to serve as clutch jaws for engagement with the clutch jaws 80 of the positive second gear 72.

Clutch jaws 26' and 27', respectively, are at opposite ends integral with the shiftable clutch member 81, the clutch jaws 26' corresponding and for engagement with either the jaws 25' or jaws 79, while clutch jaws 84, corresponding and adapted to be engaged by jaws 27', are formed on the enlarged portion 82 of the driven shaft 23'.

Preferably, the shiftable clutch member 81 has a mounting relation for rotation relative to, and for shiftwise longitudinal movement over, a bearing surface periphery of the enlarged portion 82 of the driven shaft 23', indicated by 85.

Selective permanent reduction gear ratio and reverse at this point are described as follows:

In the position shown the jaw clutch member 81 is establishing the transmission for automatic change speed forward operation by placing clutch jaws 25' and 26' and clutch jaws 27' and 28' in an engaged status, thus direct drive coupling the intermediate sleeve shaft 24' to the clutch shaft 11' through the body of the clutch member 81, while leaving the driven shaft 23' free at its forward end. Assuming the clutch member 81 as responsive to shifter movements in the shift path P illustration by Fig. 10 wherein "Direct, Neutral and Automatic change speed" are indicated, and assuming the gear member 78 as responsive to shifter movements in the other shift path Q wherein "Reverse, Neutral and Permanent reduction gear" are indicated, to establish permanent second reduction gear the shifter of path P is moved from its present position, indicated by X, to neutral of path P, whereby the clutch member 81 will be shifted forwardly until the jaws 26' pass forwardly out of engagement with jaws 25' and until the jaws 27' come into engagement with the jaws 84. This establishes the clutch member 81 in direct coupled relation with the driven shaft 23' but leaves the latter free with respect to the clutch shaft 11'. The shift is now moved through the usual neutral cross-over from path P to path Q whereby the clutch member 81 is left in its new position coupling itself to the driven shaft 23', and the shifter of the path Q is moved rearwardly to "Permanent reduction gear." This latter shift operation carried the gear 78 rearwardly until its splines 83, serving as its jaw clutch parts, engage the jaws 80 of the driven gear 72, whereby a positive two-way gear drive reduction gear train giving an exemplary 1.75:1 ratio from the clutch shaft 11' to the driven shaft 23' through gears 75 and 73 and gears 74 and 72 and the clutch member 81 is established.

Actuating the shifter in the path Q forwardly to "Reverse" will leave the clutch member 81 disconnected from the shaft 11' and the gear 72 and in direct coupling to the driven shaft 23', but will carry the gear 78 forwardly until the latter is taken out of engagement with the jaws 80 of the gear 72 and brought into gear tooth mesh with the reverse idler gear 77, thus establishing "Reverse" gear drive between the shafts 11' and 23' through the gears 75, 73, 76, 77 and 78. It will be seen that the reverse gear drive establishment is also without dependency upon the planetary gear units e', f' and g' of the automatic change speed transmission mechanism.

*Neutral*

With the shifter in either shift path P or Q of the shift pattern illustrated by Fig. 10 and respectively therein positioned at "Neutral" the clutch member 81 will be found out of clutch jaw engagement with both the clutch shaft 11' and the gear 72, but in clutch jaw engagement, i. e., parts 27' engaged with parts 84, thereby direct coupling the clutch member 81 and driven shaft 23' together, while the gear 78 will be found out of clutch coupling with the gear 72 and out of gear tooth mesh with the reverse idler gear 77, thus establishing the entire transmission neutral. Thus I have described the selective gear set provision in the modified illustrative embodiment of the present invention and its operation for establishing either neutral or reverse or permanent forward positive reduction gear.

Description of the automatic change speed division of the modified illustrative embodiment of my present invention follows:

The overdrive gear set e' comprises a planet carrier 29' upon which are rotatably mounted planet gears 30' and with which latter both an internal gear 31' and a sun gear 32' mesh. A ratchet 85, having a periphery 86 slotted at spaced intervals as indicated by 87 to receive a pawl 88 the latter arranged radially reciprocal in the forward end wall 89 of automatic change speed gearbox 18', is fixed to the sun gear 32'. A solenoid 90 forming the electro-magnetic device *i1* of this modified illustrative embodiment of my invention is secured to the case 18' and adapted through a rod 91 to actuate the pawl 88 out of engagement with the ratchet 85 when the driver elects to supply a current to the solenoid 90. A spring 92 is arranged to urge the pawl 88 to enter one of the ratchet slots 87 whenever the solenoid 90 is de-energized. While it will be seen that this form of electro-magnetic device may be conveniently placed in communication with a switch to be contacted by depressing the accelerator pedal to a given position, and that similarly to the flexible differentiating form of electro-magnetic device *i1* illustrated by Fig. 1 and described in connection with that preferred illustrative embodiment of the present invention, this positive form of brake application and brake release for the sun gear of the overdrive gear set e' component of the invention would require temporary cessation of torque in order for the pawl 88 either to engage or disengage the ratchet 85, and accordingly imposing that the power be temporarily shut off either for rendering of the overdrive gear set operative or inoperative. It will be seen that normally de-energized the solenoid 90 will permit the spring 92 obtaining and normally retaining engagement between the pawl 88 and ratchet 85, and that consequently, as in the differentiating embodiment illustrated by Fig. 1, a brake action will be normally established between the sun gear 32' and the gear case 18', and that in turn consequently the overdrive gear set e' will normally be operative.

That the gear train g' may gear function singularly solely under drive of the sleeve shaft 24', a one-way stop brake L1' comprising, preferably, a smooth surfaced hub 39', a cam broached annulus 40' and roller wedging members 41' is disposed between the internal gear 36' and the gear case 18'. In this same realm, so that the other gear train f' of the reduction gear set h' may later be established to forwardly drive the internal gear 36' of the gear train g thereby to supplement the drive by the latter's sun gear 33a', a second one-way brake L2', preferably identical in structure to the previously described one-way brake L1, is disposed between the internal gear 38' of the gear train f' and the gear case 18'. By these twin one-way brakes, the reduction gear set h, solely under drive by the sleeve shaft 24' and sun gear 33a' and the internal gear 36' receiving reactance from the one-way brake L1', will give an exemplary low 2.49:1 reduction gear ratio between the sleeve shaft 24' and the driven shaft 23', while underdrive of both sun gears 33' and 33a' and the internal gear 38' receiving reactance from the one-way brake L2', the reduction gear set h' will give a second exemplary 1.54:1 reduction gear ratio between the multi-drives of concentric intermediate shafts 93 and 24' and the driven shaft 23'.

A planet carrier 34' integral with the driven shaft 23' carries planet gears 35' rotatably mounted thereby and meshing with both the sun and internal gears 33a' and 36', and a planet carrier 36a' integral with the internal gear 36' carries planet gears 37' rotatably mounted thereby and meshing with both the sun gear 33' and the internal gear 38'. Thus I have completely described the reduction gear set h' of the modified embodiment of the invention illustrated by Figure 6.

A rearward cylindrical extension 94 of the internal gear 31' of the overdrive gear set e' forms a carrier for driving friction clutch elements 95 to turn with the extension, while mating driven friction clutch elements 96 are provided to turn with the secondary or auxiliary intermediate sleeve shaft 93. A bottom pressure plate 97 to these clutch elements 95 and 96 is connected to rotate with the extension 94 and overdriven internal gear 31'. A back plate 98 for a presser plate 99 both rotatable with the driven annulus 43' of the direct drive one-way clutch j' form an opposite end embodiment completing the friction clutch unit r so as same, when engaged, will serve to couple both the driven annulus 43' of the direct driven one-way clutch j' and the overdriven internal gear 31' to the auxiliary sleeve shaft 93 and second sun drive gear 33'. By this double function adaptation of the friction clutch r, the sun gear 33' of the gear train f' of the speed reduction gear set h' would, upon the clutch r engaging, be driven at increased speed relative to the train comprising the clutch and main intermediate shafts 11' and 24' through the medium of function by the overdrive gear set e', but would, upon the overdrive gear set e' being rendered inoperative or neutral, be driven at the same speed as the clutch and main intermediate shafts 11' and 24' through the medium of the mobilized one-way direct drive connections provided by the one-way clutch j'. Accordingly, while the reduction gear set h' is initially under drive of the main intermediate sleeve shaft 24', exclusively, to the single sun gear 33a' and the one-way brake Ll' is serving reactance to the internal gear 36' of the singularly operating gear train g', the transmission will initially automatically render the exemplary 2.49:1 reduction low or first gear ratio to the driven member 23' from the clutch shaft 11'. So that a second gear ratio may be later automatically established under torque to supplant the named first gear ratio, centrifugal weights 100 are provided and arranged to force the presser plate 99 rearwardly away from the back plate 98 against the influence of retractive springs 101 harnessed to exert their energy forwardly upon the presser plate 99, whereby the clutch elements 95 and 96 will become clutch packed between the plates 97 and 99 under urge of the speed responsive weights 100. When the speed of rotation of the back plate 99 carrying the weights 100, under drive of the one-way clutch j', has attained a predetermined speed, a toggle linkage 102, arranged under tension of a spring 103 to prevent rearward movement of the presser plate 99, the latter under urge of the weights 100, will collapse under centrifugal force concentrated about the central wrist 104 and thereby permit the weights 100 to actuate the plate 99 rearwardly. Accordingly, when the speed of the main intermediate shaft 24' has driven the back plate 98 of the friction type automatic clutch r up to a speed corresponding, for example, to an attained vehicle speed of 12 M. P. H. under drive of the named first or low gear ratio by the gear train g' singularly, the clutch r will engage, under torque, and if the overdrive gear set e' has not been rendered inoperative by retraction of the pawl 88 from the ratchet 85 by the solenoid 90, the overdrive output of the gear set e' will flow through the now engaged clutch r to the sun gear 33', thus bringing the gear train f' into play supplementing a parallel drive to the internal gear 36' over the drive to the sun gear 33a'. An exemplary ratio by the overdrive gear set e' now operating to drive the gear set f' and the gear set g' also operating under drive of the main intermediate shaft 24' would be 1.54:1, constituting a transitional automatic change speed from first to a fast second gear ratio under torque. However, should the solenoid 90 be energized any time following engagement of the clutch r the overdrive gear set e' would become inoperative and the engaged clutch r would depend upon the one-way clutch j' for drive. The direct drive speed of the one-way clutch j' would result in the driving influence of the gear train f' upon the gear train g' being slower than under the drive of the overdrive gear set e'. By employing the electro-magnetic function of the unit ll' following engagement of the clutch r, an exemplary slow second reduction ratio by the combined gear set h' of 1.75:1 would result. Three reduction gear ratios are thus obtainable in the automatic range of change speeds in this modified form of the present invention, namely 2.49:, 1.75: and 1.54:.

Under drive of the 1.54:1 ratio, or of the 1.75:1 ratio, respectively, depending upon whether the overdrive gear set e' is operating or has been rendered inoperative, upon a temporary reduction in speed of the clutch shaft 11', representing the driving member, relative to the driven member 23, such as would follow a temporary shut off of the power or sufficient throttling down of the engine, the centrifugal parts 46' of the automatic speed responsive clutch mechanism k' would reach synchronism with and enter the slots 47a' of the driven clutch member 47'. Thereafter the member 47' being rotatable with the internal gear 38, the centrifugal clutch parts 46' being rotatable with the internal gear 31' of the overdrive gear set e' and the engaged clutch r operating to couple the sun gear 33' of the gear train f' rotatable with the internal gear 31' would establish the elements of the gear set f' in connection to rotate as a unit, leaving the overdrive gear set e' and the final reduction gear train g' gear functioning. An exemplary 0.68 ratio of overdrive by the gear set e' and an exemplary 2.49:1 ratio by the gear train g' would result thereafter in the overdrive ratio of 0.68 to the internal gear 36' through the locked gear train f' breaking down differentially in the gear train g' against the direct drive ratio of the sun gear 33a' to substantially 0.78 overdrive ratio delivery to the driven shaft 23'. Therefore, assuming the overdrive gear set e' to be operating when torque-reversal is effected thereby obtaining engagement of the clutch k', the resultant automatic speed change would be from normally prevailing 1.54:1 gear ratio to 0.78 overdrive ratio.

As in the preferred illustrative embodiment of the present invention, shown by Fig. 1, likewise in this modified embodiment shown in Fig. 6, causing the internal gear set e' to become inoperative, following the engagement of the clutch unit k', will result in the one-way clutch j' coming into play, in this modification however, only to drive the direct drive locked gear train f'. The direct drive ratio prevailing as a drive to the sun gear 33a' will however result in a direct drive ratio delivery to the driven shaft 23' as substitute for the 0.78 ratio overdrive when the overdrive gear set e' is rendered inoperative.

It will be seen that five forward speeds, namely 2.49:1, 1.75:1, 1.54:1 direct drive and 0.78 overdrive, constitute the scope of the automatic change speed range of the modified embodiment of my present invention as illustrated by Fig. 6. It affords an automatic change speed downward from overdrive ratio to the so-called "pick-up or climb" direct drive ratio by the driver exercising his will over the overdrive gear set e', i. e., to cause the solenoid 90 to be energized which latter in turn will render the overdrive gear set inoperative by electro-magnetically actuating the pawl 88 out of engagement with the ratchet 85. The pawl and ratchet type of establishable brake provision between the sun gear 32' and the gear case 18', as hereinbefore explained, requires a temporary cessation of torque in order to operate either way. The provision of a system of frictionally engaging brake elements, shown in Fig. 1, for establishing and disestablishing brake effect between the sun gear 32 and the case 18 constitutes flexible means operable either way under torque. Regardless of the form of electromagnetic means *i* provided for disengaging the brake embodiment of the present invention which cooperates with the overdrive gear set *e* therein, the flexible form of this particular brake means provision illustrated by Fig. 1 constitutes an improvement and an auxiliary feature of the present invention.

In the embodiment illustrated by Fig. 1, it will be seen that parallel multi-paths of power-flow are provided for between the internal gear 31 and, respectively, a sun gear element 33 of the reduction gear set *h* and an internal gear element 38 of the same gear set *h*, following torque reversal and the consequential engagement of the normally overdrive ratio establishing clutch unit *k*. While in the embodiment illustrated by Fig. 6, similar parallel multi-paths of power-flow are provided for between the same gear members but, respectively, one through the clutch unit *r* and the other through the clutch unit *k'*. In either case, a further improved feature of the present invention resides in the provisions for these parallel multi-lanes of power-flow to come into play incidental to a clutch engagement in one of the multi-paths for power-flow, whereby only a portion of the power transmitted is transmitted by a given path of power-flow in which the respective clutch is interposed in series as the driving connection completing means therefor.

Thus it will be seen that I have provided a novel combination, novel detailed forms and arrangements making up an automatic change speed transmission capable of improved and phenomenal change speed performances. A rugged, comparatively simple and inexpensive construction void of fluid operable devices and small gadget complexities, such as valves, intricate systems of fluid ducts, relay valves and all sorts of small contrivances oftentimes proposed in the obtaining of fewer desired performance results than those which the present invention is capable.

I desire it to be understood that the apparatus shown is generally only illustrative and that the invention can be carried out by other means within the scope of my claims.

What I claim is:

1. In a change speed power transmitting mechanism, a driving member, a driven member, a centrifugally actuated clutch reposing between said members and having resilient means for disengaging same when sufficiently slow speed rotation is attained in the mechanism, transmitting means for rotating said driven member from said driving member at reduced speed driving ratio whose driving connections in that capacity will be mobilized between said members as long as said clutch is disengaged, transmitting means for rotating said driven member from said driving member at a faster speed driving ratio whose driving connections will be completed in that capacity between said members upon engagement of said clutch, transmitting means automatically establishable in mobilized driving connections to rotate said driven member from said driving member at an intermediate speed driving ratio with respect to said speed reducing and said faster speed driving ratios by engagement of said centrifugally actuated clutch including an overrunning clutch whereby the simultaneous establishment of said faster speed driving ratio between the same said driving and driven members by said centrifugally actuated clutch is permitted, and spring actuated normally automatically establishable means for mobilizing said faster speed transmitting means to be established between said members when said centrifugally actuated clutch engages and forming means for forced disestablishment at the will of the operator thereby to abnormally render said faster speed transmitting means no drive over the function of said centrifugally actuated clutch whereby the intermediate speed driving ratio mobilized concurrently with establishment of said faster speed driving ratio may be intermittently enabled to rotate said driven member from said driving member in the stead of said faster speed driving ratio without immobilizing the driving connections of the latter.

2. Mechanism as in claim 1 and wherein when said means for forced disestablishment at the will of the operator is employed prior to engagement of said centrifugally actuated clutch said speed reducing driving ratio transmitting means will be stepped down to a relatively lower speed reducing driving ratio in operative connection for rotating said driven member from said driving member.

3. A power transmitting mechanism including power transmitting members including members normally mobilized giving slow speed driving ratio between two of the members while standstill or slow speed rotation prevails in the mechanism, tending to automatic change between said two members from said slow speed driving ratio to a faster speed driving ratio and lending to automatic mobilization in one-way intermediate driving ratio connections between said two members simultaneously with establishment of said faster driving ratio including an overrunning clutch associated with the members for simultaneous mobilization in said intermediate driving ratio permitting simultaneous establishment of said faster driving ratio between said two members, having means automatically operable when certain conditions, attending appreciable speeds of rotation in the mechanism, have been attained to establish said faster speed driving ratio and to simultaneously mobilize said intermediate speed driving ratio between said two members forming means, until becoming operative, allowing said normally mobilized slow speed members to drivingly manifest their driving rate between said two members, and means employable at will to abnormally render an established said faster speed driving ratio neutral to allow a period of driving manifestation by said mobilized intermediate speed driving ratio between said two members but whereby the driving connections of said faster speed driving ratio would not be irretrievably immobilized beyond automatic reestablishment upon the passing of influences as of said means for rendering said faster driving ratio abnormally neutral.

4. The mechanism described in claim 3 and wherein said means automatically operable to simultaneously establish the faster speed driving ratio and the mobilization of the intermediate speed driving ratio between said two members comprises automatic speed responsive clutch mechanism operable upon a single occurrence of temporary reduction in the speed of the driving member relative to the driven member to both establish said faster speed driving ratio and complete mobilization of said intermediate speed driving ratio between said two members.

5. The mechanism described in claim 3 and wherein said means employable at will to abnormally render an established said faster driving ratio neutral comprises a system of engageable and disengageable members normally for engagement, having resilient means tending to effect their engagement, having means including an electromagnet adapted to be supplied with electric current at the will of the operator and forming means to effect disengagement of said engageable members, and said members when engaged forming means only partially mobilizing the driving connections for said faster speed driving ratio to be mobilized completely between said two members by said automatically operable means whereby optional disengagement of said engageable members would open the driving connections of said faster driving ratio over the function of said automatically operable means.

6. In a power transmitting mechanism, the combination of a driving member, a driven member, transmitting means for rotating said driven member from said driving member at reduced speed relative to the speed of said driving member, means for automatically changing the driving ratio between said members from said speed reducing ratio to overdrive when certain conditions, attending attainment of appreciable speeds of rotation in the mechanism have been attained therein, including means for simultaneously establishing mobilized direct driving connections between said members, an overrunning clutch associated with said direct drive mobilizable driving connections permitting simultaneous establishment of overdrive, said means for automatically simultaneously establishing overdrive and mobilized direct driving connections including a clutch associated with the driving connections of both and engageable only when its two clutch members are operated in substantial synchronism, and centrifugally operable means for actuating one of said clutch members into engaged position.

7. In a change speed transmission gearing for automatic establishment to rotate a driven member from a driving member either at greater speed than or at the same speed as the driving member constituting overdrive and direct drive respectively, in combination, an overrunning clutch associated with direct drive permitting establishment of overdrive and mobilized driving connections of direct drive between the same said driving and driven members at the same time, the automatically establishable direct drive means of said transmission gearing constituting means to that end immobilized until overdrive has been established, means for automatically establishing overdrive when certain conditions have been attained in the mechanism and for simultaneously establishing direct drive in mobilized connections between said driving and driven members but to be overrun in said overrunning clutch, and means for optionally abnormally rendering an automatically established state of overdrive neutral for the automatically mobilized direct drive connections to operate in the stead of overdrive between said driving and driven members including means for automatically retrieving overdrive operative between said members following discharge of the influences accomplishing optional rendering of overdrive abnormally neutral.

8. The mechanism described in claim 7, together with transmitting means for initially rotating said driven member from said driving member at reduced speed relative to the 1 of said driving member including a device for transmitting forces in one direction permitting, and said reduced speed driving ratio for automatic dissolution from, so driving upon automatic establishment of overdrive and simultaneous establishment of mobilized direct drive connections between said driving and driven members.

9. In a motor vehicle change speed transmission mechanism, in combination, transmission gearing through which a driving member and a driven member are adapted to be drivingly connected and constituting a multi-speed transmission mechanism unit for manual selection between the respective said members solely either in free-wheeling or in positive gear operation therebetween, in free-wheeling selection forming means for automatic establishment in overdrive between said driving member and said driven member when certain conditions have been attained in the mechanism, in free-wheeling selection transmitting means giving mobilized direct driving connections between said members attending an established overdrive therebetween, and in positive gear selection solely transmission means for and thereby establishable giving two-way positive gear drive between said driving and driven members.

10. In a motor vehicle change speed transmission, an engine, an engine clutch, a clutch shaft associated with said engine clutch, a speed reducing gear train, a one-way clutch operated by said clutch shaft and operable to drive said speed reducing gear train, a speed increasing gear train operated by said clutch shaft and operable to drive said speed reducing gear train, a driven member to be driven by said speed reducing gear train, means for establishing a direct drive operative connection to said driven member for operation by either said one-way clutch or said speed increasing gear train, and means for establishing or for disestablishing said speed increasing gear train drive operative.

11. In a power transmitting apparatus, in subcombination, a planetary gear unit, a one-way stop brake operating on said gear unit to render its gear train one-way gear drive, a two-way stop brake mechanism for optional operation on said gear unit to render its gear train two-way gear drive, a clutch for connecting the elements of said gear unit to rotate as a unit, means for automatically disengaging said clutch when sufficiently slow speeds of rotation are prevalent in the apparatus, means for automatically engaging said clutch when certain conditions have been attained in the apparatus, said two-way brake mechanism forming means when out of brake operating position mobilizing connections only whereby said clutch may accomplish connection of the elements of said gear unit to rotate as a unit, and said two-way brake mechanism forming means upon being actuated towards a brake operating position operable to immobilize said connections beyond capability of the function of said clutch to connect the elements of said gear unit to rotate as a unit.

12. In a power transmitting mechanism, the combination with a planetary gear unit through the gear function of which a driving member and a driven member depend for interconnection to rotate at relative speeds, with a one-way stop brake upon which said gear unit depends for reactance in one direction thereby to drive the driven member in one direction and permitting overrun in the same direction, and with means including a main clutch for establishing a faster driving ratio of positive two-way drive characteristics between said members; of means including a shiftable member in one position forming a clutch sub-related to said main clutch and forming means mobilizing connections only whereby said main clutch may close a circuit of said connections and thereby accomplish establishment of said faster driving ratio, shifted out of said one position and into another position said shiftable member thereby immobilizing said connections beyond said main clutch closing a circuit and thereby opening said connections beyond said main clutch accomplishing establishment of said faster driving ratio, in said other position said shiftable member forming a two-way stop brake by which said planetary gear unit will be given two-way reactance and will constitute a two-way gear drive interconnecting said driving and driven members, and said shiftable member shiftable whether or not said main clutch is engaged, all whereby either a one-way gear drive by a given planetary gear train may be changed to a two-way gear drive at will or a two-way faster driving ratio established by a clutch may be changed to a relatively lower speed two-way gear drive at will without disengaging said establishing clutch.

13. In a transmission, in sub-combination, two coaxial power transmitting members mounted for rotation; a planetary gear set interconnecting said two members having a one-way stop brake operating on same whereby said gear set will have the status of a one-way gear drive between said two members; a centrifugally actuated clutch for connecting the elements to rotate as a unit whereby a two-way direct drive coupling would result between said two members; and means for optionally establishing said gear set in two-way positive gear function between said two members either from a one-way gear drive status or from a two-way direct drive connected status therebetween, whether or not said clutch is engaged and forming means so operable without disengaging or imposing prevention against said clutch engaging.

14. In a power transmitting mechanism, in sub-combination, a driving member, a driven member, a planetary gear unit between said members having an orbital element adapted to be held from rotating for reactance function to the planetary gear train, a stationary friction member, a revolvable friction brake element associated therewith, means for either engaging or disengaging said friction members, an epicyclic gear train differentially interconnecting said revolvable friction brake element and said stationary friction member on one side with said orbital element on the other side forming mechanical connections adapted to be locked static by engagement of said friction brake elements and thereby to assume an appreciable holding ratio of any forces manifesting themselves in said orbital element.

15. In a power transmitting mechanism, in sub-combination, a driving member; a driven member; a planetary gear unit between said members and having an orbital element adapted to be held from rotating to give reactance to the gear train of said unit; and brake mechanism for holding said orbital element comprising a stationary bottom friction brake member, a stationary member supporting an annular electromagnet, a nonrotatable presser friction brake member and a revolvable engageable friction brake member both disposed between said stationary bottom friction and said magnet supporting member, springs compressed between said presser and magnet supporting member urging said presser member to brake pack said revolvable brake member between said presser and bottom friction presser members, and an interconnection between said revolvable brake member and said orbital element all forming resilient means normally but yieldingly applied brake mechanism for electromagnetic influence thereover solely for its optional release and allowing for reactance application to, or release from, the gear train when the latter is under torque.

16. In a variable speed power transmitting mechanism, in sub-combination, a system of frictionally-engaging members for coaction to transmit forces forming means thereby for contributing at least to said mechanism being established in certain driving speed ratio and forming means for release from engagement thereby to be attendant at least to bringing another driving ratio in said mechanism into play, resilient means tending to normally accomplish engagement of said frictionally-engaging members, means electro-magnetically operable solely for optionally accomplishing release of said frictionally-engaging members, and an epicyclic gear train in conjunction with said frictionally-engaging members forming a circuit of connections depending to be closed upon said frictionally-engaging elements and thereby its gear elements to be locked static forming a mechanical train parallel to and for relieving said frictionally-engaging elements of an appreciable proportion of the forces to be transmitted by the device of which said frictionally-engaging elements are constituent.

17. In a power transmitting mechanism, parallel power-flow lanes of different speed ratio transmitting connections drivingly associated individually with a common power transmitting member, including a one-way clutch and a speed increasing gear train; another power transmitting member, said other member in axial alignment with said first-mentioned member; and automatically variable change speed transmission mechanism for changing the gear ratio between both said one-way clutch and said speed increasing gear train and said other power transmitting member from speed reducing driving ratio to direct when certain conditions, attending appreciable speeds of rotation, have been attained in the mechanism.

18. The mechanism described in claim 17 and wherein said automatically variable change speed transmission mechanism includes a speed reducing planetary gear unit provided with a one-way stop brake operating thereon and further includes an automatic speed responsive clutch mechanism for establishing direct operable upon a temporary torque-reversal in the mechanism when sufficient speeds of rotation are prevalent therein.

19. In a motor vehicle change speed transmission which includes two power transmitting members mounted for rotation, the combination with transmission gearing for driving one of said members from the other at a greater speed including an overdrive planetary gear unit having a resilient means automatically normally applying brake mechanism operating thereon and an electromagnet for forcing release of said brake and electric current communication with said electro-magnetic to be switched on when the implement for opening the vehicle engine throttle is actuated to or beyond a certain position and a clutch for drivingly connecting said two power transmitting members through said overdrive gear train such that the latter's ratio will drivingly prevail therebetween as established overdrive and whose two clutch members are engageable only when operated in substantial synchronism and centrifugally operable means for actuating one of the clutch members into engaged position; of a train of connections including an overrunning clutch in series therein for completed mobilization in a state for direct driving said one of said two members in one direction from said other of said two members and permitting overrun of said driven one of said two members in the same direction forming direct drive so mobilizable upon said two clutch members reaching said substantial synchronization and becoming centrifugally engaged whereby prior to initial establishment of over-drive direct drive would not present itself mobilized, and transmitting means between said two members drivingly operable, prior to establishment of overdrive, to rotate said driven one of said two power transmitting members from said driving one of same at reduced speed relative to said driving member.

20. In a change speed power transmitting mechanism, the combination of a driving member, a driven member, transmitting means for initially rotating said driven member from said driving member at reduced speed relative to the speed of said driving member comprising a speed increasing planetary gear train and a speed reducing planetary gear train for tandem simultaneous gear function to give said speed reduction rotation to said driven member, controlled reactance means to said speed increasing planetary gear unit for rendering the latter gear drive operative or its elements loose to idle neutral, mobilized lower speed driving connections including an overrunning clutch drivingly operable in the stead of said speed increasing gear unit when rendered neutral, and means for automatically establishing direct drive coupling connection operative in the stead of said speed reducing gear train when certain conditions, attending appreciable speeds of rotation in the mechanism, have been attained therein.

21. In a change speed power transmitting mechanism, the combination of in-line transmission members, interrupted at one point by an overdrive planetary gear unit having an orbital element with a two-way stop brake mechanism associated with said orbital element comprising engageable and disengageable elements provided with resilient means for normally but yieldingly engaging same and with an electromagnet for optionally accomplishing their disengagement, and interrupted at another point by a speed reducing planetary gear unit having an orbital element with a one-way stop brake operating thereon and with a centrifugally actuated clutch for connecting the speed reducing gear elements to rotate as a unit.

22. In a power transmitting mechanism, the combination of a driving member, a driven member, automatically variable change speed transmission mechanism for changing the gear ratio between said members from a given to a faster speed ratio when certain conditions have been attained in the mechanism and for concurrently automatically completing mobilization of driving connections for rotating said driven member from said driving member at an intermediate speed ratio with respect to said given and said faster ratios, including a clutch for establishing said faster speed ratio and whose clutching function depended upon by said intermediate speed ratio for complete driving connections and means for abnormally rendering an established state of said faster driving ratio neutral between said members, without molesting the established drive through said clutch to the load, for said mobilized intermediate speed ratio to come into play therebetween to rotate said driven member.

23. In a power transmitting mechanism, the combination of a driving member, a driven member in axial alignment therewith, automatically variable change speed transmission for changing the gear ratio between said members from that rotating said driven member from said driving member at a given reduced speed relative to said driving member to that for rotating said driven member from said driving member at greater speed than said driving member including an automatic speed responsive clutch mechanism for establishing said greater speed driving ratio operable upon a temporary reduction in speed of the driving member relative to the driven member, means for optionally temporarily rendering the transmitting means, when giving said given reduced speed ratio, neutral forming means capable of accomplishing same without incurring immobilization of the driving connections of said given reduced speed ratio, and transmitting means of said automatically variable change speed transmission mobilized to rotate said driven member from said driving member at a further reduced speed relative to said driving member than that of said given reduced speed while said means for temporarily rendering the latter neutral are being employed.

24. In a power transmission, the combination of a driving member, a driven member, automatically variable change speed transmission mechanism for changing the driving ratio between said members from slow speed to that for rotating said driven member at a greater speed than said driving member, including a speed increasing planetary gear train for gear drive contributory to said slow speed ratio and a speed reduction gear train for overruling the increased speed with speed reduction between said members to render said slow speed driving ratio therebetween, and including a clutch for establishing said greater speed driving ratio whereby the speed increasing function of said speed increasing gear train will drivingly predominate between said members to rotate said driven member at said greater speed than said driving member automatically operable when certain conditions are attained in the mechanism, automatically applying brake mechanism operable on said speed increasing planetary gear train to give reactance thereto for same to gear drive and forming brake mechanism adapted to be forced out of its automatically applying state and into a released state at will thereby to render said speed increasing gear train neutral and in turn to abnormally render an automatically established said greater speed driving ratio neutral, and a train of connections automatically operable to assume drive of said driven member from said driving member at a lower driving ratio than that of said slow speed when said brake mechanism is forced into a released state before said automatically operable clutch has engaged.

25. In a power transmitting mechanism, the combination of a drive member; a driven member; wholly planetary type change speed gearing normally initially adjusted for rotating said driven member from said drive member at a given ratio of reduced speed relative to said drive member until engagement of an automatic clutch; means for automatically establishing a faster speed driving ratio between said members still through gear function in said planetary gearing including an automatic speed responsive clutch mechanism, constituting said aforementioned clutch, for establishing said faster speed operable upon a temporary reduction in speed of the drive member relative to the driven member; engageable and disengageable parts associated with said planetary gearing being conditioned to render said speed reduction drive from said drive member to said driven member having resilient means for automatically engaging same and having electro-magnetically operable means for forcing their disengagement at the will of the operator; and transmitting means automatically operable to rotate said driven member at a drop in speed, relative to that by said faster speed driving ratio, but to a faster speed relative to that by the given reduction ratio from which said faster speed supplantively established upon engagement of said clutch, when said parts are forced out of engagement while said clutch is engaged.

26. In a power transmitting gear and control means therefor, the combination of a planetary gear mechanism, and a resilient means normally applied system of frictionally-engaging element brake mechanism for taking the reaction of gear function by said gear mechanism, with electro-magnetically operative means solely for causing disengagement of said frictionally-engaging brake elements over the influence of their resilient means engagement energizing agent, forming brake means for applying or for releasing under constant reaction torque conditions whereby to change the driving ratio between two members transitionally without interruption of the drive and to slip compensate in the brake to break the shock of the speed changing differential either up or down under either the predominating resilient or electro-magnetically operating means.

27. In a power transmitting mechanism, the combination of a drive member adapted to be driven from the power source, a plurality of separately gear functional epicyclic gear trains each having an individual reactance means for their respective gear function, and means whereby each of said epicyclic gear trains may be individually driven from said drive member including a one-way clutch in series in the individual drive means from said drive member to at least one of said epicyclic gear trains whereby said one of said epicyclic gear trains may be one-way driven from said drive member regardless of the character of simultaneous individual drive to the other of said epicyclic gear trains from said drive member.

28. In a power transmitting mechanism, the combination of a drive member, a driven member, variable speed transmission mechanism between said drive and driven members including a plurality of individually gear functional epicyclic gear trains each having a separate reactance means in conjunction with which the respective epicyclic train is rendered gear functional, at least one of said plurality of epicyclic trains adapted to be driven from said drive member either through the gear function of at least one either through the gear function of at least one intermediately disposed one of said epicyclic trains or directly from said drive member while the elements of said intermediate epicyclic train are conditioned to idle each of said elements loose to rotate, means for direct driving said one of said epicyclic trains from said drive member while the elements of said intermediate epicyclic train are enabled each to idling rotate, and means for selectively establishing the elements of said intermediate epicyclic gear train either gear functional drivingly connecting said one epicyclic train to be driven therethrough from said drive member or said elements of said intermediate epicyclic gear train loose to idle each rotatively.

29. In a power transmitting mechanism, the combination of a plurality of epicyclic gear trains in parallel series to be simultaneously driven for simultaneous gear function collectively to assume propulsion of a common load; and means for simultaneously driving said plurality of epicyclic gear trains from a common driving member including a one-way clutch in series in said driving means.

30. In a power transmitting mechanism, the combination of a drive member, a driven member, a transmitting train for drivingly connecting said drive and driven members including two sets of epicyclic gearing, individual reactance means operable exclusively on one of said epicyclic gearing sets including a system of frictionally-engaging brake elements whereby the respective epicyclic gearing set may gear drive in either direction, individual reactance means operable exclusively on another of said epicyclic gearing sets including one-way stop brake instrumentalities whereby the respective epicyclic gearing set may free-wheel upon any tendency of the load thereon to overrun the drive thereto, and means whereby the named epicyclic gearing sets may gear function collectively contributary to a driving connection from said drive to said driven member.

31. In a power transmitting mechanism, the combination of a drive member, an axially aligned driven member, an axially aligned intermediate shaft, a parallel series plurality of epicyclic gear trains each having a sun drive pinion rotatable with said intermediate shaft and together forming a parallel series differential planetary gearset to drive said driven member, a single planetary gear unit for gear driving said intermediate shaft from said drive member, automatic means for controlling said parallel series plurality of epicyclic gear trains aforesaid forming the differential planetary gearset to initially be gear functional to give a slow transmission ratio and to be subsequently alterable to give a faster transmission ratio when certain conditions are attained in the mechanism including a device for transmitting torque forces in one direction only and whereby said faster transmission ratio may be established without immobilizing the operative connections for said slow speed transmission ratio, and means for complementing either said single planetary gear unit to give a gear functional transmission connection between said drive member and said intermediate shaft or alternatively renderability of a direct drive connection between said drive member and said intermediate shaft.

32. In a power transmitting mechanism, the combination of a drive member, an axially aligned driven member and an axially aligned sun pinion drive gear intermediate shaft for a planetary gearing to drive said driven member, a parallel series plurality of epicyclic gear trains at least certain of which having a sun pinion gear driven from said intermediate shaft and all for conjoining-gear-function under certain conditions to drive said driven member, a single planetary gear unit for gear driving said intermediate shaft from said drive member, and means for by-passing direct drive from said drive member axially through the assembly of said single planetary gear unit to said intermediate shaft while the elements of said single planetary gear unit remain non-static.

33. In a power transmission, the combination of axially aligned drive, driven and intermediate shafts; a first planetary gear train driven by said drive shaft and driving said intermediate shaft; a reduction second planetary gear set driven from, and having a sun driving gear element rotatable with said intermediate shaft, said second gear set driving said driven shaft; means for establishing or for disabling said first planetary gear train drive operative between said drive and intermediate shafts; and means automatically operable to rotate said intermediate shaft from said drive shaft in the stead, and singularly as a consequence of, drive disablement of said first planetary gear train between the drive and intermediate shafts.

34. In a power transmitting mechanism, the combination: of a driving member; a driven member; automatically variable change speed transmission for changing the gear ratio between said driving and driven members from a slow speed driving ratio indirectly between said members to a faster speed driving ratio still indirectly between said driving and driven members including automatic clutch means to establish said faster speed but still indirect driving ratio operable when certain conditions are attained in the mechanism, means under control of the operator operable to abnormally temporarily render said faster speed but still indirect driving ratio in neutral while leaving said clutch engaged, and means depending upon the engaged condition of said clutch and automatically operable as a singular consequence of rendering said faster speed but still indirect ratio in neutral to drive said driven member from said driving member at an otherwise unattainable intermediate speed ratio during the interim of said faster speed but still indirect driving ratio being temporarily neutralized, whereby optionally neutralizing said faster speed but still indirect drive ratio subsequent to engagement of said clutch is to kick-down the gear ratio between said driving and driven members to an intermediate gear ratio of drive that is faster than the gear ratio normally supplanted by operation of said clutch.

35. In a power transmission, in combination, a drive shaft, an overdrive planetary gear unit driven by said drive shaft including an internal overdriven output gear element, a primary driven mass rotatable with said overdriven internal gear including the driving element of a centrifugally operable clutch mechanism whose two members engageable only when operated in substantial synchronism, an overrunning clutch between said drive shaft and said overdriven primary driven mass, and a secondary driven system whose lead member carries the mating member of said centrifugally operable clutch mechanism, said secondary driven system drive related circumventionally of said centrifugally operable clutch with said primary driven mass.

36. In a mechanism for coupling a driving member to drive a driven member in either of different speed ratios, in combination, a first internal gear, one-way stop brake means to hold said first internal gear, a second internal gear, a first output planet carrier rotatable with said second internal gear and whose carried planet pinion meshes with said first internal gear, a second output planet carrier whose planet pinion meshes with said second internal gear, a sun gear shaft common to the planet pinions carried by each said first and second planet carriers, and an automatic speed responsive clutch mechanism for establishing the elements of this planetary gearing connected to rotate as a unit operable upon a temporary reduction in the speed of the driving member relative to the driven member.

37. In a mechanism for coupling a driving member to drive a driven member in either of different speed ratios, in combination, an overdrive planetary gear set compounded with a speed reduction and torque-multiplying planetary gear set, alternately operating spring and electro-magnetic devices controlling the reactance for gear function in said overdrive gear set and alternately operating one-way stop brake means and centrifugally operable clutch mechanism respectively to give reactance for gear function in, and alternately to connect the elements of said reduction planetary gear set to rotate as a unit, said clutch mechanism operable only when its two members are operated in substantial synchronism.

38. In a power transmission, in combination, a drive shaft, a planetary gear train having a sun driving gear element and an internal second driving gear element and an output planet carrier whose carried planet pinion meshes with each said sun and internal gears, a centrifugally operable clutch mechanism whose two clutch members are adapted to engage only when operated in substantial synchronism, said clutch connected to drive said internal gear, means for driving said sun gear and the driving element of said clutch from said drive shaft either at a different speed than, or at the same speed as, said drive shaft, and brake means adapted to give reactance to said internal gear as an alternate to operation of said clutch.

39. In a power transmission, in combination, a drive shaft, a slow speed connection driven from said drive shaft including an overrunning clutch, a faster speed connection driven from said drive shaft and in parallel series with said slow speed connection, a transmitting body driven by the output of each said slow speed and said faster speed connections, a centrifugally operable clutch mechanism whose two members are adapted to engage only when operated in substantial synchronism, the driving clutch member of said clutch carried rotatably with said transmitting body, a load shaft, said transmitting body connected with said load shaft and the driven clutch member of said clutch connected with said transmitting body and with said load shaft whereby initially the drive from said transmitting body to said load shaft would maintain said two clutch members out of synchronism, and means associated with said connection between said transmitting body and said driven clutch member and said load shaft including a second overrunning device whereby a temporary reduction in the speed of said drive shaft, or said transmitting body, relative to said load shaft would attain said substantial synchronism of said two clutch members.

EVERETT R. BURTNETT.